May 4, 1926.
A. T. FOWLES
AUTOMATIC WATER HEATER
Filed May 12, 1924
1,583,680
2 Sheets-Sheet 2
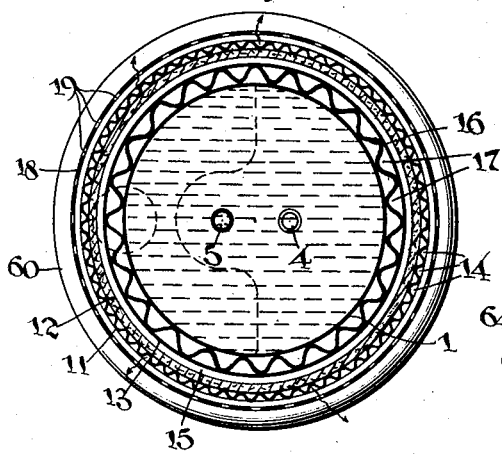
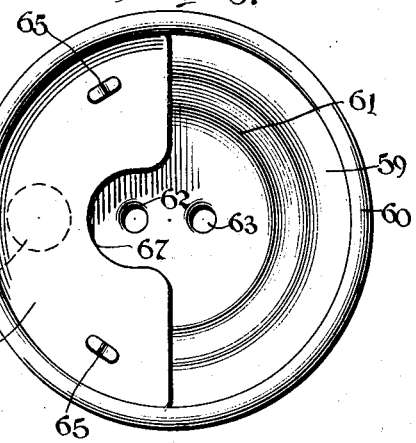
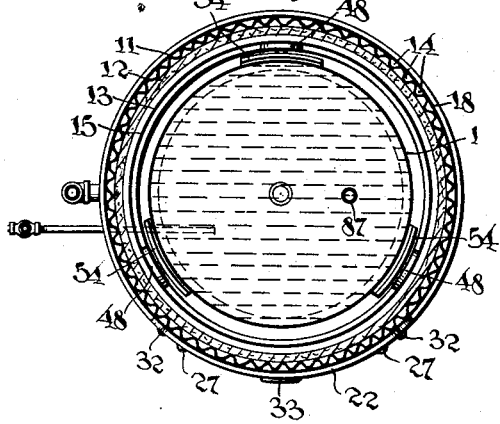
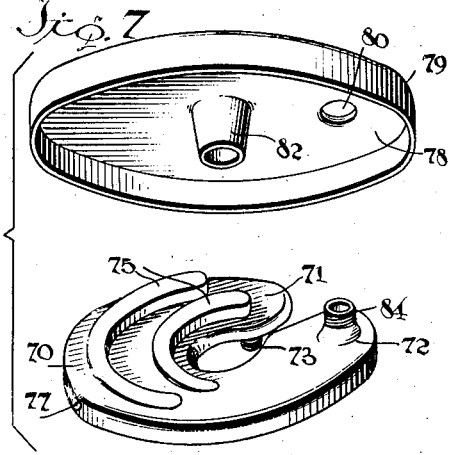
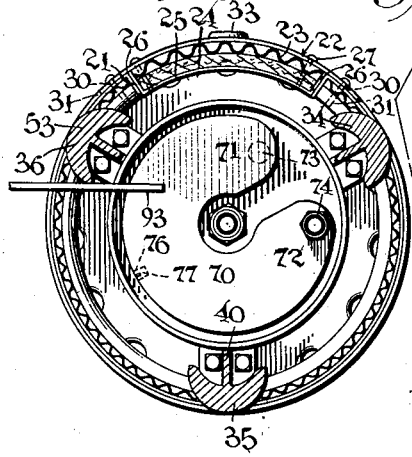
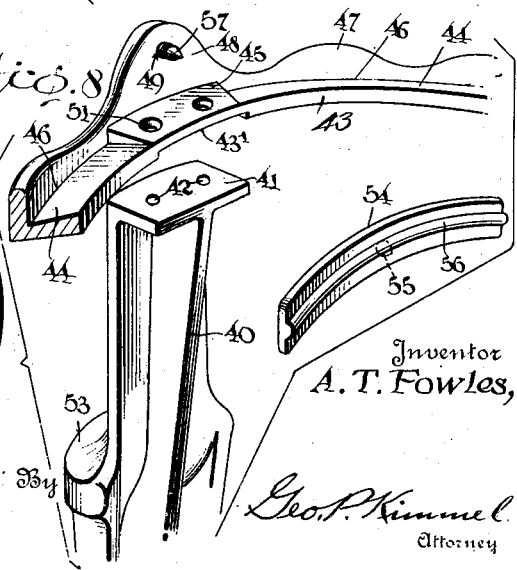
Inventor
A. T. Fowles,
By Geo. P. Kimmel
Attorney Patented May 4, 1926.

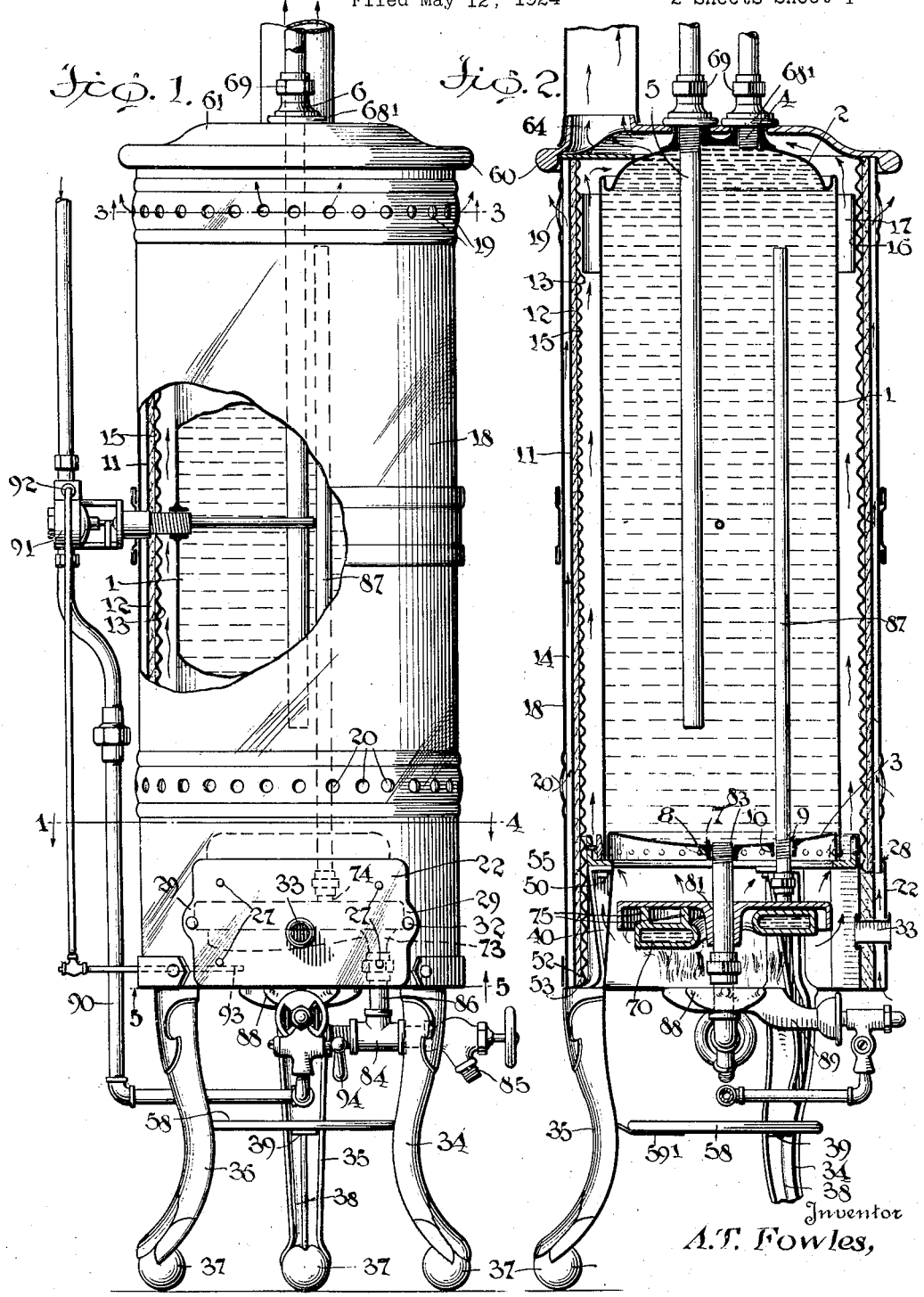

1,583,680

UNITED STATES PATENT OFFICE.

ALFRED T. FOWLES, OF DALLAS, TEXAS.

AUTOMATIC WATER HEATER.

Application filed May 12, 1924. Serial No. 712,872.

*To all whom it may concern:*

Be it known that I, ALFRED T. FOWLES, a citizen of the United States, residing at Dallas, in the county of Dallas and State of Texas, have invented certain new and useful Improvements in Automatic Water Heaters, of which the following is a specification.

This invention relates to an automatic water heating apparatus of the storage type, and has for its object to provide an apparatus of such class, in a manner hereinafter set forth, with means to facilitate the heating of cold water supplied to the apparatus, as well as further with means for automatically discontinuing the supply of burning fluid employed for heating purposes when the water is heated to a predetermined temperature.

A further object of the invention is to provide, in a manner as hereinafter set forth, a water heating apparatus including a storage tank for the hot water and further including a jacket element inclosing said tank for not only retaining the water substantially at the temperature to which it has been heated, but furthermore for conducting the products of combustion from a heating element circumferentially of the water tank to facilitate the heating of the water to the desired temperature.

A further object of the invention is to provide, in a manner as hereinafter set forth, a water heating apparatus including a water tank, a jacket therefor, an inclosing shell for the jacket and a supporting stand common to said tank, jacket and shell, and further providing the supporting stand with means for collecting the products of condensation for the purpose of vaporizing these latter, under such conditions overcoming the collection of moisture at the bottom of the tank, jacket and shell.

A further object of the invention is to provide, in a manner as hereinafter referred to, a water heating apparatus including a water tank, a jacket therefor, and means to provide for the setting up of a draft between the jacket and the tank, as well as equalizing the draft for carrying off the products of combustion.

A further object of the invention is to provide a water heating apparatus, in a manner hereinafter set forth, including a water tank, a jacket therefor, and an inclosing shell for the jacket, and with said shell provided with means to provide for the circulation of air between it and the jacket, thereby maintaining the lowest degree of temperature at the outer side of the jacket.

A further object of the invention is to provide, in a manner as hereinafter set forth, a water heating apparatus including a water heating and spreading drum arranged in proximity to a heating element and providing means to facilitate the heating of the supplied cold water on its passage to the water storage tank of the apparatus.

Further objects of the invention are to provide, in a manner as hereinafter set forth, a water heating apparatus of the storage type, and which is comparatively simple in its construction and arrangement, strong, durable, compact, thoroughly efficient in its use, automatic in its action, readily assembled and disassembled, and comparatively inexpensive to install.

With the foregoing and other objects in view, the invention consists of the novel constructioin, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:

Figure 1 is an elevation of a water heating apparatus of the storage type, broken away, in accordance with this invention.

Figure 2 is a vertical longitudinal section taken at right angles to Figure 1.

Figure 3 is a cross sectional view of the apparatus on line 3—3, Figure 1.

Figure 4 is a section on line 4—4, Figure 1.

Figure 5 is a section on line 5—5, Figure 1.

Figure 6 is an inverted plan view of the cover of the apparatus.

Figure 7 is a grouped perspective view of the hood and heating drum.

Figure 8 is a fragmentary view of the supporting stand and retaining member.

A water heating apparatus, in accordance with this invention, comprises a water tank, a jacket therefor, an inclosing casing or shell for said jacket, a supporting stand common to said tank, jacket and shell, a burner element, a combined water heating and spreading drum arranged over said burner element, a cold water conducting element between said tank and drum, a hood mounted on the drum and constituting a heat retainer, a hot water conducting element between said drum and tank, a gas supply means having a thermostatic controlling element therefor, a cover common to the tank, jacket and shell and provided with a draft equalizer, and cold water supply and hot water discharge means.

The water tank comprises a hollow cylindrical body portion 1 of substantial height and which is formed with a closed top 2 and a closed bottom 3. Connected to the top 2 and projecting upwardly therefrom, is a hot water discharge means in the form of a substantially elongated nipple 4 which opens into the tank 1 directly at the upper end thereof. Fixed to the top 2, as well as projecting slightly above the same and further depending from the top into a point in proximity to the bottom 3, is a cold water supply means in the form of a substantially elongated pipe 5. That end of the pipe 5 which projects a short distance above the top 2, is in the form of a peripherally threaded nipple 6, for the purpose of connecting the pipe 5 with a cold water feed pipe, not shown. The nipple 4 is peripherally threaded for the purpose of connecting therewith a hot water discharge pipe not shown.

The bottom 3 is formed, centrally with an opening 7, and the lower face of the bottom 3 is formed with a boss 8 which surrounds the opening 7. The bottom 3, at one side of the opening 7, is formed with an opening 9, and depending from the lower face of the bottom 3 and surrounding the opening 9, is a boss 10.

The jacket which incloses and further which is spaced from the water tank, is cylindrical in contour and of greater length than the length of the tank. When the jacket is set up in operative relation with respect to the water tank, the lower portion of the jacket depends below the bottom of the tank. The jacket is formed of an outer section 11, an intermediate section 12 and an inner section 13. The outer and inner sections are constructed from sheet metal of suitable gauge and the intermediate section is formed of asbestos. The sections 11, 12 and 13 are fixedly secured together. The outer section 11 is formed throughout with vertically disposed corrugations forming air passages 14, and the inner section 13 is formed throughout with circumferentially extending corrugations providing dead air spaces 15.

When the jacket is arranged in operative relation with respect to the water tank, it is spaced therefrom, through the medium of a circumferentially extending row of vertically disposed spaced ribs 16 surrounding the tank near its upper end, and the said ribs can be formed integral with the outer face of the tank 1, or formed from a vertically corrugated band of suitable width which is fixedly secured to the tank. The ribs 16 form outlet passages 17 for the products of combustion which pass upwardly between the jackets and water tank.

The inclosing casing or shell for the jacket consists of a hollow cylindrical body 18, formed from sheet metal of suitable gauge and which has the jacket fixedly secured to the inner face thereof. The casing or shell 18, near its upper end, is formed with a circumferentially extending series of air outlets 19, and near its lower end with a circumferentially extending series of air inlets 20, and the said inlets and outlets, in connection with the air passages 14, provide means for the circulation of air in an upward direction between the section 11 of the jacket and the inner face of the shell or casing thereby maintaining the outer side of the jacket at a low degree of temperature as the cold air will enter through the inlets 20 and pass upwardly between the shell or casing and the jacket and discharge through the outlets 19. The air passages 14 also provide means to enable the travel of air between the casing or shell and the jacket from the lower to the upper end thereof and which will also tend to maintain the outer side of the jacket at a low temperature.

The corrugating of the outer and inner sections of the jacket increases the rigidity thereof. The providing of the dead air spaces 15 prevents the heat, to a material extent, from penetrating the section 13 to the asbestos section 12, on the travel of the heat upwardly between the water tank and the jacket.

The shell or casing, as well as the jacket, is cut away at the lower portion thereof to form an entrance opening 21 so that access can be had to the interior of the jacket at the lower portion thereof, and said entrance opening is closed by a removable sight member formed of an outer plate 22 of greater length and width than the opening 21, an intermediate vertically corrugated sheet metal plate 23 secured against the inner face of the plate 22 and of less length and width than said plate 22, a sheet of asbestos 24 secured against the rear face of and of the same length and width as the plate 23, and an inner plate 25 of sheet metal which projects above the plate 22 and has angularly bent ends 26 which overlap the ends of the plate 23 and asbestos sheet 24. The reference character 27 denotes holdfast devices which are common to the plates 22, 23 and 25 and asbestos sheet 24 for securing them together. The plate 23 and asbestos sheet 24 have the tops thereof spaced below the top of the plate 22, and the tops of the plate 23 and asbestos sheet 24, in connection with the plates 22 and 25 provide a pocket 28 for the reception of the top wall of the entrance opening 21. The length of the plate 22 is such that it will project beyond the side walls of the entrance opening 21, and each end of the plate 22 is formed with an apertured lug 29. The apertures in the lug 29 are indicated at 30 and register with aligning openings 31 formed in the casing and jacket. The openings 30 and 31 are provided for the passage of retaining means 32 for detachably connecting the sight member to the casing and jacket for the purpose of closing the opening 21. Formed centrally of the plates 22, 23, 25 and asbestos sheet 24, is a substantially enlarged opening, and extending through such opening is a flanged collar 33 which is upset at its inner end against the plate 25, whereby the collar is fixedly secured to the sight member. The collar 33 provides a sight opening for viewing the interior of the lower end of the jacket when the sight member is arranged in closure position with respect to the opening 21.

The supporting stand for the shell, jacket and water tank, is so constructed as to support the tank from the top thereof and to support the jacket and shell at a point intermediate its upper and lower ends exteriorly of the stand. The supporting stand comprises three vertical legs 34, 35 and 36 and each of which has a globular foot piece 37 at its lower end, and each of the legs is arcuate in cross section at any point above the foot piece 37. The inner face of each leg at the lower portion thereof is formed with a lengthwise extending reinforcing rib 38, centrally thereof, and the rib 38 merges at its top into a transversely extending web 39 integral with the inner face of the leg and which provides a support. Each of the legs is furthermore provided on its inner face, centrally thereof, with a lengthwise extending reinforcing rib 40 which starts at a point spaced above the web 39 and terminates into an inwardly extending flange 41 which is formed at the upper end of the leg. The flange 41 is provided with a pair of openings 42.

Mounted on the flanges 41 is a supporting annulus 43, having its body portion of substantial width for the purpose of supporting the lower edge of the body portion of the water tank and further having the upper face of its body portion formed with spaced bevelled surfaces 44 which incline from the inner toward the outer edge of the annulus. The bevelled surfaces 44 have arranged therebetween flat rectangular surfaces 45, positioned above the bevelled surfaces 44 so that the ends of that part of the material of the annulus which provides the rectangular surfaces will constitute end walls for pockets which are formed by bevelling the upper surface of the body portion of the annulus 43.

The setting up of the upper surface of the body portion of the annulus 43 with bevelled surfaces 44, forms upstanding flanges 46 which constitute the outer walls of the pockets. The pockets referred to provide means for collecting the products of condensation from the water tank and such products are vaporized, owing to the fact that the annulus 43 is heated from the action of a heating element to be hereinafter referred to.

The top edge of each of the flanges 46 is formed with a series of upstanding lugs 47, and formed integral with the portions of the body of the annulus 43 which provide the rectangular surfaces, are upstanding lugs 48 of greater height than any of the lugs 47. The lugs 48 are arranged at the outer edge of the body of the annulus 43 and each of which is formed with an opening 49.

The annulus is mounted upon the inwardly extending flanges of the legs 34, 35 and 36, and is detachably connected therewith by holdfast devices 50 which extend up through the openings 42 and also through the openings 51 formed in the portions of the annulus which provide the rectangular flat surfaces 45.

The lower face of the annulus 43, is provided with a plurality of pockets 43′, and the number of said pockets corresponds in number to the number of supporting legs for the annulus. The flanges 41, at the upper ends of the supporting legs, extend into the pockets 43′ and the ends of said pockets overlap the ends of the flanges 41, thereby preventing the annulus from shifting on the legs. The pockets 43′ also provide means to facilitate the positioning of the legs with respect to the lower face of the annulus.

Each of the legs 34, 35 and 36, between its center and its upper end, is offset as at 52 to provide a supporting ledge 53 for the lower edge of the shell and jacket.

When the shell, jacket and water tank are supported from the stand, the lower edge of the tank rests upon the rectangular flat surfaces 45, and the shell and jacket depend below the annulus 43, surround the upper portion of the legs 34, 35 and 36 and rest upon the ledges 53. When mounting the water tank, jacket and shell in position with respect to the stand, the tank is seated on the surfaces 45, after which the jacket and shell are arranged in inclosing position with respect to the tank and so that the jacket and shell will be supported on the ledges 53. Prior to the positioning of the jacket and shell, the lower end of the tank is fixedly secured to the annulus 43 by a series of retaining members, and each comprises a short strip of metallic material of substantial width and of arcuate form and each of the strips is indicated at 54. The outer face of each strip is provided with a pocket 55, and its inner face with a lengthwise extending rib 56. The retaining members are arranged between the water tank and the lugs 48 and are held into abutting engagement with the water tank by set screws 57 which engage in the openings 49 and also in the pockets 55. The lugs 47 and 48 prevent the shifting of the tank from off the annulus 43.

The supports provided by the webs 39 are employed for holding a dust or drip pan 58 which is positioned between the legs 34, 35 and 36. The pan 58 is circular in contour and has secured therewith a series of outwardly projecting arms 59' which rest on the webs 39 whereby the pan 58 will be suspendingly supported between the legs 34, 35 and 36, intermediate the upper and lower ends thereof.

A cover is provided for the shell, jacket and tank and which also constitutes means for connecting the shell and jacket with the tank. The cover consists of a circular body portion 59 of a diameter to extend to the outer edge of the casing or shell, and said body portion is formed with a depending rounded rim 60, which when the cover is mounted in position, surrounds the outer face of the casing or shell at the upper end thereof. The body portion 59 is formed with a dome-shape or upstanding part 61, having its lower terminus surrounded by the marginal part of the body portion 59, and the said dome-shape part 61 is formed with an opening 62 for the passage of the nipple 6 of the cold water supply pipe, and further with an opening 63 for the passage of the nipple 4 of the hot water discharge pipe. The body portion 59 is also formed with an opening 64 which constitutes an outlet for the products of combustion, and the opening 64 is arranged in the marginal part and dome-shape part of the body portion 59.

Secured to the inner face of the marginal part of the body portion 59, by the holdfast devices 65, is a draft deflector plate 66 of semi-circular contour and which abuts against the inner face of the rim 60 at the upper end of said rim. The plate 66, at its inner edge is formed with a semi-circular cut away portion 67, providing a clearance for the cold water supply pipe. The plate 66 opposes the outlet 64 and is spaced from the dome-shaped part 61 of the body portion 59 to provide a pasasge leading to the outlet 64. The plate 66 opposes less than half of the dome-shape part 61, owing to the fact that the plate is provided with the cut away portion 67. The products of combustion on arising to the top of the jacket, will partially come in contact with the plate 66 and be deflected to the opposite side of the closure for the purpose of passing out through the outlet 64. The plate 66 constitutes what may be termed an equalizer as it provides for the products of combustion to be uniformly discharged through the outlet 64.

Securing collars 68' are mounted on the nipples 4 and 6 and engage with the cover as well as surround the openings 62 and 63. Securing devices 69 are provided for the collars 68 and which engage with the nipples 4 and 6. The securing devices can be unions for connecting pipe extensions to the nipples, or may be nuts if desired.

Arranged below, as well as being spaced from the bottom of the water tank and further inclosed by the lower portion of the jacket, is a combined water spreading and heating drum 70 of substantial height and further of a contour substantially similar to a horse shoe, whereby said drum 70 is set up with a pair of legs 71, 72. The bottom, at the outer end of the leg 71, is formed with a water inlet opening 73, and the top at the outer end of the leg 72 is provided with a water outlet opening 74. The drum 70 is so set up whereby it will incline in a direction from the inlet 73 to the outlet 74. The upper face of the drum 70 is formed with up-standing spaced ribs 75 extending from a point removed from the free end of one of the legs and terminating at a point removed from the free end of the other of the legs of the drum.

The drum 70 is a hollow casting of any suitable metallic material and is not only utilized for the purpose of spreading the cold water supplied thereto, but also employed for the heating of water when spread, and the drum 70, at its center, or what may be termed its toe end, is provided with an opening 76 having a threaded wall with which engages a screw plug 77, for the purpose of closing the said opening. The plug 77 is removable so that access can be had to the drum for the purpose of cleaning or removing any sediment that may be collected therein. The setting up of the drum of horse shoe shape provides for the convenient positioning or removing it when occasion requires.

Mounted on and surrounding the drum is a hood element and which constitutes a heat retainer. The said element consists of a circular plate 78 terminating in a depending annular rim 79, which is of a width, when the element is arranged in position with respect to the drum, to be substantially flush with the lower face of the drum. The plate 78, at a point in proximity to the rim 79, is formed with an opening 80, and said plate 78, centrally thereof, is provided with an opening 81. Formed integral with the lower face of the plate 78, surrounding the opening 81 and depending from the plate 78, is a sleeve 82 which gradually decreases in diameter from its upper towards its lower end, and said sleeve 82 is of a length greater than the height of the drum whereby when the hood element is mounted in position to inclose the drum, the sleeve 82 will depend below the drum 70.

When the hood element is mounted in operative relation with respect to the drum 70, the lower face of the plate 78 is supported upon the ribs 75 whereby the plate 78 is spaced from the top of the drum 70.

The hood element is employed for the purpose of retaining the heat from the burner element, to be presently referred to, to act on the drum and as the heat collects around the drum it is retained or checked by the rim 79 and also by means of the sleeve 82. The ribs on the upper face of the drum 70 permit of the heat to pass between the plate 78 and the top of the drum and furthermore act to support the hood element in horizontal position.

Secured to the bottom 3 of the water tank, and registering with the opening 7, is a cold water conducting pipe 83 which extends down through the sleeve 82 and terminates at its lower end in an angularly disposed branch 84, formed with a drain cock 85. Extended upwardly from the branch 84, is a branch pipe 86 which communicates with the inlet 73 of the drum 70.

Leading from the outlet 74 of the drum 70, is a vertically disposed conducting pipe 87 for discharging the hot water into the tank. The pipe 87 extends through the opening 80 in the plate 78 and up through the opening 9 formed in the bottom 3. The pipe 87 terminates at a point removed from the upper end of the water tank.

Supported upon the conducting pipe 83 below the drum 70, is a burner element 88 of any suitable construction and as shown said element 88 is provided with an extension 89 to which is attached a gas supply pipe 90, having interposed therein a thermostatic gas supply controlling element 91 which extends through the casing or shell, jacket and into the water tank. The thermostatic controlling element 91 is provided with a by-pass 92 for use in connection with a pilot light 93. The gas supply pipe is provided with a cut off-94.

The outer diameter of the annulus 43 is such with respect to the inner diameter of the inner section 13, whereby the annulus will be spaced from said section 13, so that the products of combustion will pass around the annulus 43 and into the space between the water tank and jacket.

The apparatus is of that type when the gas supply is turned on, the thermostatic controlling element will operate to discontinue the supply of gas to the burner when the temperature of the water reaches such a point as to provide for the operation of the thermostatic controlling element for the purpose of closing the supply. The cutoff 94 is arranged below said element and under normal conditions is open.

It is thought that the many advantages of a water heating apparatus constructed in accordance with the foregoing description taken in connection with the accompanying drawings, can be readily understood to one familiar with the art to which the apparatus belongs, and although the prefered embodiment of the invention is as illustrated and described, yet it is to be understood that changes in the details of construction can be had which will fall within the light of the invention as claimed.

What I claim is:

1. In a water heating apparatus of the type described, a water tank jacket comprising an inner, an intermediate and an outer section secured together, said intermediate section formed of a sheet of asbestos and each of the other sections constructed of metallic material, said outer section formed throughout with lengthwise extending corrugations and said inner section formed throughout with circumferentially extending corrugations.

2. In a water heating apparatus of the type described, a water tank jacket comprising an inner, an intermediate and an outer section secured together, said intermediate section formed of a sheet of asbestos and each of the other sections constructed of metallic material, said outer section formed throughout with lengthwise extending corrugations and said inner section formed throughout with circumferentially extending corrugations, and an inclosing casing or shell for said jacket, said casing fixedly secured in contact with the outer section of said jacket and provided near its top and near its bottom with a circumferentially extending row of openings communicating with the spaces formed between the casing and the corrugations of said outer section.

3. In a water heating apparatus, a water tank jacket and an inclosing casing for said jacket, said casing and jacket cut away at their lower portions to provide an entrance opening, and a closure for said opening, said closure formed of an inner and an outer and a pair of intermediate sections, said intermediate sections aligning with the jacket and its enclosing casing, one of said intermediate sections being vertically corrugated and the other formed of a strip of impervious material, said intermediate sections being of less length than said inner section and overlapped thereby, and said inner section extending above said outer section.

4. In a water heating apparatus, a combined water spreading and heating drum, comprising a body portion of horse shoe shape thereby providing a pair of legs opposed sidewise throughout, the bottom of one of said legs near its free end formed with a water inlet and the top of the other of said legs near its free end provided with an outlet.

5. In a water heating apparatus, a combined water spreading and heating drum, comprising a body portion of horse shoe shape thereby providing a pair of legs opposed sidewise throughout, the bottom of one of said legs near its free end formed with a water inlet and the top of the other of said legs near its free end provided with an outlet, said drum inclining in an upward direction from its inlet towards its outlet.

6. In a water heating apparatus, a combined water spreading and heating drum substantially of horse shoe shape, said drum provided with an inlet and outlet and on its top with spaced rigs, a hood supported on said ribs and provided with a rim inclosing said drum, said hood further provided centrally with an opening and with a depending sleeve registering with said opening and extending through said drum.

7. In a water heating apparatus, a combined water spreading and heating drum substantially of horse shoe shape, said drum provided with an inlet and outlet and on its top with spaced ribs, a hood supported on said ribs and provided with a rim inclosing said drum, said hood further provided centrally with an opening and with a depending sleeve registering with said opening and extending through said drum and depending below the latter.

8. A water heating apparatus comprising a water tank, a cold water conducting pipe leading from the bottom of said tank, a horse shoe shaped drum arranged below the tank and having said pipe depend therebelow, an inclosing hood mounted on said drum and provided with a depending sleeve through which extends said pipe, means for establishing communication between said pipe and the bottom of said drum, and means for establishing communication between the top of the drum and the interior of the tank.

9. A water heating apparatus comprising a water tank, a jacket enclosing the same and having its inner face provided with circumferentially extending corrugations, and a spacing element extending circumferentially of the upper portion of the tank and provided with vertically disposed corrugations, said spacing element abutting against the circumferential corrugations of the jacket.

10. In a water heating apparatus the combination with a water tank, a jacket surrounding the tank, and an inclosing casing for said jacket, said casing and jacket depending below said tank, of a supporting stand common to said tank casing and jacket, said stand having means at its top for supporting said tank, and means on its outer face below its top for supporting the jacket and casing, said jacket inclosing the means at the top of said stand and spaced from the first mentioned means to provide for the passage of the products of combustion upwardly between the tank and jacket.

11. In a water heating apparatus the combination with a water tank, a jacket surrounding the tank, and an inclosing casing for said jacket, said casing and jacket depending below said tank, of a supporting stand common to said tank, casing and jacket, said stand having means at its top for supporting said tank, and means on its outer face below its top for supporting the jacket and casing, said jacket inclosing the upper portion of said stand, and adjustable means for fixedly securing the lower end of the tank to the top of the stand.

12. In a water heating apparatus a supporting stand comprising a horizontally disposed annulus and a series of supporting legs therefor, said annulus having its top provided with means interiorly of its outer edge for supporting the water tank and with upstanding lugs at its outer edge for retaining the water tank thereon, certain of said lugs being of greater height than the others, retaining elements arranged against the inner face of the lugs of greater height, and adjustable means extending through the lugs of greater height and engaging said elements for fixedly securing the water tank upon the annulus.

13. A water heating apparatus comprising a water tank, a jacket element inclosing said tank and spaced therefrom, a casing for said element and a cover element common to said jacket and casing and formed with an upstanding portion, said cover element extending over and connected with said tank and further provided with an eccentrically disposed vent opening, and a deflector secured to its inner face, said deflector having a portion thereof spaced from a part of said upstanding portion to provide a passage leading to the vent opening, and said deflector providing means for equalizing the draft.

In testimony whereof, I affix my signature hereto.

ALFRED T. FOWLES.